June 9, 1964 W. H. ZINN 3,136,699
NEUTRONIC REACTOR SYSTEM
Filed Feb. 21, 1946
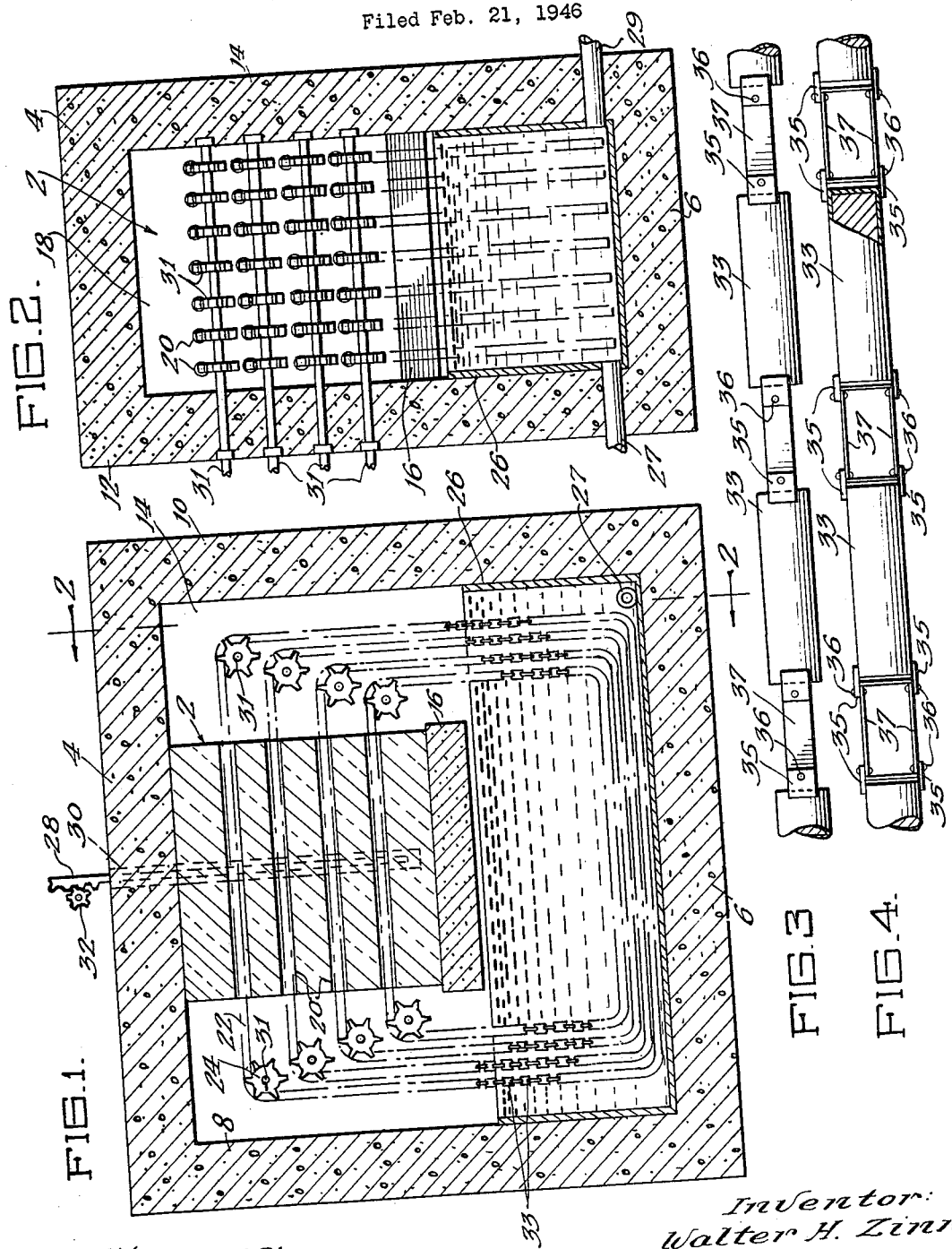
Witnesses:
Francis W. Test
Walter S. Schlegel, Jr.
Inventor:
Walter H. Zinn
By: Robert A. Lanruiter
Attorney United States Patent Office 3,136,699
Patented June 9, 1964

3,136,699
NEUTRONIC REACTOR SYSTEM
Walter H. Zinn, Chicago, Ill., assignor to the United States of America as represented by the United States Atomic Energy Commission
Filed Feb. 21, 1946, Ser. No. 649,399
1 Claim. (Cl. 176—28)

This invention relates to neutronic reactors and more particularly to a novel means for cooling the fissionable material within such a reactor by circulating said material through a body of coolant disposed externally of the reactor.

In neutronic reactors a thermal neutron fissionable (herein called "fissionable," as is common in the art) isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing fissionable material such, for example, as natural uranium, disposed in a neutron slowing material which slows the neutrons to thermal energies. Such a slowing material is termed a neutron moderator. Graphite, beryllium, and $D_2O$ (heavy water) are typical moderators suitable for such use. Accordingly, the term "moderator" as used both in the specification and in the claim, will be understood to have the meaning commonly assigned to it in the nuclear reactor art, that is, as referring to materials predominantly containing elements of atomic weight of 16 or less. Heat is evolved during the reaction which must be removed in order to maintain stable temperature conditions in the reactor. Specific details of the theory and essential characteristics of such reactors are set forth in copending application of Enrico Fermi and Leo Szilard, Serial No. 568,904, filed December 19, 1944, now Patent No. 2,708,656.

In neutronic reactors the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption of localized neutron absorbers, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways:

(1) By absorption or capture in the uranium content of the bodies without producing fission;
(2) By absorption or capture in the moderator material itself;
(3) By absorption or capture by the impurities present in both the uranium bodies and in the moderator; and
(4) By leakage out of the system through the periphery thereof.

The present invention is particularly concerned with the removal of heat from the reactor. A general object of the invention is to provide a novel method and means for cooling solid fissionable material within a neutronic reactor by circulating said material through a body of fluid coolant disposed externally of the reactor.

A more specific object of the invention is to provide a reactor such as above described comprising elongated members moving into and out of the neutron moderator and containing fissionable material, said members being cooled externally of said moderator.

Another object of the invention is to provide endless flexible members containing fissionable material, and means for moving said members through adjacent bodies of neutron moderator and a coolant.

Still another object of the invention is to design a neutronic reactor wherein the fissionable material is in the form of endless chains circulated as by sprockets through the neutron moderator and through cooling means disposed externally thereof.

The foregoing and other objects and advantages of the invention will become apparent from a consideration of the accompanying specification and the drawings whereof:

FIG. 1 is a diagrammatic, central, vertical sectional view taken through a structure embodying the invention, portions of the structure being shown in elevation;

FIG. 2 is a transverse vertical sectional view taken in the plane indicated by line 2—2 of FIG. 1;

FIG. 3 is a fragmentary side elevational view of one of the reactive chains shown in FIG. 1; and FIG. 4 is a top plan view of the chain shown in FIG. 3.

The neutronic reactor generally designated 2 is disposed within a concrete vault comprising top and bottom walls 4 and 6, and end walls 8 and 10, side walls 12 and 14 and a horizontal wall or ledge 16 extending between the side walls 12 and 14 and spaced from the walls 8 and 10, said vault being adapted to absorb biologically harmful emanations, such as neutrons and alpha, beta and gamma rays.

The reactor 2 comprises a mass of neutron moderator 18, such as graphite or beryllium with longitudinal passages 20 extending therethrough, said moderator being supported by ledge 16. Endless chains 22, containing fissionable material, and constructed as hereinafter more particularly described, circulated as by sprockets 24 through the passages 20 and through a tank 26 containing a suitable coolant, such as ordinary water circulated through the tank by inlet and outlet pipes 27 and 29. The sprockets are rotated by shafts 31 mounted in conventional bearings (FIG. 2) and connected to any suitable actuating means (not shown) adapted to rotate said shafts.

It will be understood that the portion of the chains 22 within the neutron moderator 18 are effective to produce a nuclear fission chain reaction, inasmuch as the moderator is effective to slow neutrons within the system to thermal energies at which they are most effective to fission the fissionable material within the chains 22. The coolant within the tank 26 is preferably a substance such as ordinary water having a greater neutron capture cross section than that of the moderator 18, whereby a chain reaction in the tank 26 is prevented.

The reaction is controlled to maintain any desired neutron density within the reactor 2 by a control rod 28 adapted to reciprocate within an aluminum tube 30 extending into the moderator 18. The rod is actuated by a rack and pinion mechanism 32 and the neutron density in the reactor may be monitored by any conventional control means (not shown).

Referring now to FIGS. 3 and 4, it will be seen that each chain 22 is composed of fluid tight cartridges or containers 33 formed of neutron permeable material, such as aluminum or stainless steel, each of said cartridges containing a slug or pellet 34 of fissionable material, preferably in the form of a plutonium alloy or compound or in the form of uranium having a natural or enriched isotopic content of fissionable $U^{235}$. If desired, alternate cartridges may contain slugs or pellets 34 formed of neutron moderator, such as beryllium or graphite.

Each cartridge 33 is provided with a pair of lugs 35 welded thereto at each end thereof, the lugs at each end of each cartridge being pivoted at 36 as by rivets to connecting links 37, whereby said cartridges together with the connecting links form an endless chain as shown in FIGS. 1 and 2.

The amounts of neutron moderator and fissionable material necessary to sustain a chain reaction in a reactor such as that above described are fully disclosed in said copending application, and it will be understood that by enriching the members 34 so that they contain a greater isotopic content of fissionable material than the isotopic content of $U^{235}$ in natural uranium, the size of an operative reactor may be considerably reduced below that required for a natural uranium reactor, provided that neutronic impurities, having relatively great neutron capture cross-sections, are substantially eliminated, as more fully discussed in said copending application.

Although the above discussed theory of nuclear reaction is based on the best experimental evidence known at present, it will be understood that experimental data later discovered may modify said theory.

It will be understood that although the present invention has been described with respect to the specific details of certain embodiments thereof, it is not intended that such details shall be regarded as limitations upon the scope of the invention except insofar as included in the accompanying claim.

What is claimed is:

A neutronic reactor system comprising a vault adapted to absorb biologically harmful radiations, a ledge traversing the vault, a mass of graphite having longitudinal passages therethrough and being of lesser length than the interior of the vault supported on the ledge, a tank in the portion of the vault beneath the ledge, inlet and outlet pipes connected to the tank and extending through walls of the vault and adapted to circulate ordinary water through the tank, shafts journalled transversely of the vault in the regions adjacent to the ends of the mass of graphite, sprockets mounted on the shafts opposite the ends of the passages, and endless chains comprising fluid-tight cartridges of aluminum each containing a body of uranium, said chains being mounted on the sprockets to be driven thereby and having the depending portions thereof in said tank, and the mass of graphite and the portion of said chain within said mass being so constructed and arranged as to undergo a self-sustaining neutronic reaction.

References Cited in the file of this patent
UNITED STATES PATENTS

| | | |
|---|---|---|
| 876,183 | Herrick | Jan. 7, 1908 |
| 890,251 | Thompson | June 9, 1908 |
| 1,895,072 | Fenton et al. | Jan. 24, 1933 |
| 2,708,656 | Fermi et al. | May 17, 1955 |
| 2,736,696 | Wigner et al. | Feb. 28, 1956 |

FOREIGN PATENTS

| | | |
|---|---|---|
| 233,011 | Switzerland | Oct. 2, 1944 |
| 233,278 | Switzerland | Oct. 16, 1944 |
| 861,390 | France | Oct. 28, 1940 |
| 114,150 | Australia | May 2, 1940 |
| 114,151 | Australia | May 3, 1940 |

OTHER REFERENCES

Kelly et al.: Phy. Rev. 73, 1135–9 (1948).
Smyth: "Atomic Energy for Military Purposes," August 1945, pp. 103 and 104; page 23.